(12) United States Patent
Nuccetelli et al.

(10) Patent No.: US 8,580,028 B2
(45) Date of Patent: Nov. 12, 2013

(54) PIGMENT ADDITIVE FOR IMPROVING SOLAR REFLECTANCE

(75) Inventors: Gary L. Nuccetelli, Scenery Hill, PA (US); Lei Wang, Washington, PA (US); Daniel R. Swiler, Hagerstown, MD (US)

(73) Assignee: Ferro Corporation, Mayfield Heights, OH (US)

( * ) Notice: Subject to any disclaimer, the term of this patent is extended or adjusted under 35 U.S.C. 154(b) by 0 days.

(21) Appl. No.: 13/575,630

(22) PCT Filed: Feb. 18, 2011

(86) PCT No.: PCT/US2011/025399
§ 371 (c)(1),
(2), (4) Date: Sep. 5, 2012

(87) PCT Pub. No.: WO2011/103399
PCT Pub. Date: Aug. 25, 2011

(65) Prior Publication Data
US 2013/0036944 A1    Feb. 14, 2013

Related U.S. Application Data

(60) Provisional application No. 61/306,080, filed on Feb. 19, 2010.

(51) Int. Cl.
*C09C 1/24* (2006.01)
*C09C 1/34* (2006.01)
*C01G 49/06* (2006.01)

(52) U.S. Cl.
USPC .......................................... 106/456; 106/453

(58) Field of Classification Search
USPC ........................................ 106/453, 456, 459
See application file for complete search history.

(56) References Cited

U.S. PATENT DOCUMENTS

| | | |
|---|---|---|
| 2,419,094 A | 4/1947 | Sloan |
| 3,767,455 A | 10/1973 | Claridge et al. |
| 3,926,660 A | 12/1975 | Holle et al. |
| 3,946,134 A | 3/1976 | Sherman |
| 4,052,224 A | 10/1977 | Howard |
| 4,199,370 A | 4/1980 | Brand |
| 4,239,548 A | 12/1980 | Barnard et al. |
| 4,461,810 A | 7/1984 | Jacobson |
| 5,114,486 A | 5/1992 | Demosthenous et al. |
| 5,942,281 A | 8/1999 | Guez et al. |
| 6,174,360 B1 | 1/2001 | Sliwinski et al. |
| 6,261,691 B1 | 7/2001 | Atarashi et al. |
| 6,342,099 B1 | 1/2002 | Hiew et al. |
| 6,416,868 B1 | 7/2002 | Sullivan et al. |
| 6,582,814 B2 | 6/2003 | Swiler et al. |
| 7,060,126 B2 | 6/2006 | Andes et al. |
| 7,264,670 B2 | 9/2007 | Ruger et al. |
| 2007/0234759 A1* | 10/2007 | Sakoske et al. ............... 65/33.1 |
| 2009/0087674 A1 | 4/2009 | Slawikowski et al. |
| 2009/0293761 A1* | 12/2009 | Richardson et al. ............ 106/18 |

FOREIGN PATENT DOCUMENTS

| | | |
|---|---|---|
| RU | 2236391 | 9/2004 |
| WO | 98/38256 | 9/1998 |

OTHER PUBLICATIONS

Chang, et al, "Structure and Elastic Properties of Iron Phosphate Glasses", Chinese Journal of Physics, vol. 41, No. 4, Aug. 2003, 8 pages.
Morris, et al., "Spectral and Other Physicochemical Properties of Submicron Powders of Hematite (x-Fe2 O3), Maghemite (y-Fe2O3), Magnetite (Fe3O4), Goethite (x-FeOOH), and Lepidocrocite (y-FeOOH)", Journal of Geophysical Research, vol. 90, No. B4 pp. 3126-3144, Mar. 10, 1984, 19 pages.

* cited by examiner

*Primary Examiner* — Pegah Parvini (74) *Attorney, Agent, or Firm* — Rankin, Hill & Clark LLP (57) ABSTRACT

A pigment additive and resulting pigment are described that when incorporated in paints for example, significantly increases total solar reflectance. Also described are compositions utilizing the noted pigments, and related methods. The pigments are formed from iron oxide and/or chromium oxide and utilize as an additive, one or more phosphate compounds.

13 Claims, 5 Drawing Sheets

PIGMENT ADDITIVE FOR IMPROVING SOLAR REFLECTANCE

CROSS REFERENCES TO RELATED APPLICATIONS

This application claims priority upon U.S. provisional application Ser. No. 61/306,080 filed Feb. 19, 2010.

FIELD OF THE INVENTION

The presently disclosed embodiments are directed to the field of pigments and pigment additives.

BACKGROUND OF THE INVENTION

Pigments exhibit certain colors because they selectively reflect and absorb certain wavelengths of light. White light is an approximately equal mixture of the entire visible spectrum of light. When white light encounters a colored pigment, some wavelengths are absorbed as they interact with the electronic structure of the pigment. These interactions are determined by the chemistry and bonding of the pigment. The wavelengths not absorbed are reflected back to the observer, and this reflected visible light spectrum creates the appearance of a color. For example, ultramarine reflects blue light, typically between 400 and 500 nanometers in wavelength, and absorbs visible light of other wavelengths.

The appearance of pigments is also dependant upon the spectrum of the source light. Sunlight has a high color temperature, and a fairly uniform spectrum, and is considered a standard for white light. Artificial light sources, including fluorescent light, tend to have great peaks in some regions of their spectrum, and deep valleys in other regions. Viewed under these conditions, pigments may exhibit different colors.

Color spaces used to represent colors numerically, must specify their light source. Lab color measurements, unless otherwise noted, assume that the measurement is taken under a D65 light source, or "Daylight 6500 K", which is approximately the color temperature of sunlight.

Other properties of a color, such as its saturation or lightness, may be tailored by other substances that typically accompany pigments. Binders and fillers added to pure pigment chemicals also have their own reflection and absorption patterns, which can affect the final spectrum. Likewise, in pigment/binder mixtures, individual rays of light may not encounter pigment molecules, and may be reflected as is. These stray rays of source light contribute to the saturation of the resulting color. Pure pigment allows very little white light to escape, producing a highly saturated color. A small quantity of pigment mixed with a relatively large proportion of white binder, however, will appear desaturated and pale, due to the high quantity of escaping white light.

Pigment particles may be coated or otherwise combined with one or more additives to selectively alter the properties of the pigment. A pigment that has received much attention in this regard is titanium dioxide, $TiO_2$. This pigment is noteworthy for its wide range of applications, from paint to sunscreen to food coloring. Numerous additives and treatments have been described for modifying the properties, and typically the optical characteristics, of pigments such as titanium dioxide. Many of these treatments involve the use of phosphorous or phosphate anions. U.S. Pat. No. 2,817,595 describes a method for preparing an improved titanium dioxide pigment by calcining hydrous titanium oxide in the presence of certain phosphorous compounds. U.S. Pat. No. 3,330,798 describes depositing aluminum phosphate on titanium dioxide pigment particles. U.S. Pat. No. 3,926,660 describes precipitating a metal phosphate on a titanium dioxide pigment. U.S. Pat. No. 3,946,134 is directed to forming a protective coating of a certain phosphate complex on pigment particles. U.S. Pat. No. 4,052,224 describes treating titanium dioxide pigment with a phosphorous compound. U.S. Pat. No. 4,239,548 describes titanium dioxide pigment having one or more coatings containing phosphate radicals. U.S. Pat. No. 4,461,810 describes titanium dioxide particles coated with various anions including phosphate ions. U.S. Pat. No. 5,114,486 describes treating metal oxide pigments such as titanium dioxide with zinc phosphate. U.S. Pat. No. 5,942,281 describes treatment of titanium dioxide pigment by coating with alumina phosphate. U.S. Pat. No. 6,342,099 is directed to coated titanium dioxide pigments from multiple deposits of phosphate compounds.

Efforts have also been directed to altering the physical properties of other pigments besides titanium dioxide. WO 98/38256 describes various inorganic pigments coated with certain oxides or phosphates. U.S. Pat. No. 6,261,691 describes powder coated particles containing a layer of a metal phosphate.

Iron oxide pigments are widely used in ceramic applications, particularly in glazing. Many metal oxides provide the colors in glazes after being fired at high temperatures. Natural iron oxide pigments are called ochres. Many classic paint colors, such as raw and burnt siennas and umbers, are iron oxide pigments. Iron (III) oxide is typically used. Iron pigments are also widely used in the cosmetic field. They are considered to be nontoxic, moisture resistant, and nonbleeding. Typically, the iron (II) oxide pigment is black, while the iron (III) oxide is red or rust colored. Chromium oxide pigments are also widely used in paints, inks, and glasses. Chromium oxides often impart a green color as in CICP Green 17.

A few isolated disclosures are known in which iron or chrome based pigment particles are treated to alter their properties. For example, U.S. Pat. No. 2,419,094 describes the addition of phosphate agents to chromium-containing pigments, including chromite ($Cr_2O_3.FeO$). Although primarily directed to treating titanium dioxide pigment, U.S. Pat. No. 3,767,455 notes that chromic oxide or iron oxide pigment may be coated with a phosphate.

RU 2236391 describes grains for incorporating in building materials such as concrete products and roofing materials for increased "coloration intensity." The grains include a coating of a phosphate binder and pigment such as iron oxide and chromium oxide. U.S. Pat. No. 7,060,126 describes multilayered luster pigments which have beneficial optical properties. The "luster pigments" are metal particles having an outer "(B)" layer which can include various iron oxides such as those of iron and chromium. An outermost "(C)" layer may also include $Fe_2O_3$ or $Cr_2O_3$ which "may be phosphate-containing."

Although satisfactory in many regards, as far as is known, the prior art does not provide specific treatment strategies for improving the optical properties of iron or chrome based pigments, and particularly, for improving the solar reflectance of such pigments. Thus, it would be beneficial to provide such improvements for iron and chrome based pigments, so that superior products and applications using such pigments can be realized.

SUMMARY OF THE INVENTION

The difficulties and drawbacks associated with previous-type systems are overcome in the present pigments, compositions, and methods as follows.

In one aspect, the present invention provides a black colored pigment exhibiting improved solar reflectance. The pigment comprises a material formed in the presence of an effective amount of a phosphate. The material is in the form of a solid solution having a formula $(Cr_xFe_yMe_z)_2O_n$ where $x+y+z=1$, n is the number of oxygens required for electroneutrality, Me is at least one metal, x is greater than or equal to zero and less than or equal to one, y is greater than or equal to zero and less than or equal to one, and z is greater than or equal to zero and less than 0.3. The material when in a pressed cup form, exhibits improved average reflection with the use of phosphate between the wavelengths of 1300 and 1600 nm.

In another aspect, the present invention provides a brown or green pigment exhibiting improved solar reflectance. The pigment comprises a material formed in the presence of an effective amount of a phosphate and in the form of a solid solution having a formula $(Cr_xFe_yMe_z)_2O_n$, wherein $x+y+z=1$, n is the number of oxygens required for electroneutrality, Me is at least one metal, x is greater than or equal to zero and less than or equal to one, y is greater than or equal to zero and less than or equal to one, and z is greater than or equal to zero and less than 0.3. The material when in a pressed cup form, exhibits an average reflection of less than 25% for light having a wavelength between 400 and 600 nm. The material when in a pressed cup form, exhibits an average reflection of greater than 50% for light having a wavelength between 1300 and 1600 nm.

In yet another aspect, the present invention provides a method for forming a pigment exhibiting improved solar reflectance. The method comprises providing a pigment precursor composition including at least one of iron oxide and chromium oxide. The method also comprises adding an effective amount of one or more phosphate compound(s) to the precursor composition. The method further comprises heating the precursor composition and phosphate compound(s) to a temperature of at least 1500° F. to form a secondary composition. And, the method comprises cooling the secondary composition to thereby form a pigment. The pigment includes a material in the form of a solid solution having a formula $(Cr_xFe_yMe_z)_2O_n$ where $x+y+z=1$, n is the number of oxygens required for electroneutrality, Me is at least one metal, x is greater than or equal to zero and less than or equal to one, y is greater than or equal to zero and less than or equal to one, and z is greater than or equal to zero and less than 0.3.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

The preferred embodiment pigments exhibit improved solar reflectance properties such that the pigments reflect a relatively high proportion of light having a wavelength between 700 and 2500 nm and preferably between 1300 and 1600 nm, while reflecting a relatively low proportion of light having a wavelength between 250 and 700 nm and preferably between 400 and 600 nm. These unique reflection characteristics enable the preferred pigments to selectively reflect infrared (IR) radiation while not significantly reflecting light within the visable spectrum. Thus, the pigments maintain their desired appearance and color while also reflecting significant amounts of IR radiation.

Pigments

The present invention provides pigment derived from one or both of iron oxide and chromium oxide, in which the pigment exhibits exceptional properties, namely improved solar reflectance. In accordance with the invention, the pigment including at least one of iron oxide and chromium oxide is formed using an effective amount of one or more phosphate compound(s) which is preferably iron phosphate.

Preferably, the pigment includes iron oxide and chromium oxide. Iron oxide may be in a variety of different forms such as FeO, iron (II) oxide; $Fe_3O_4$, iron (II, III) oxide; $Fe_2O_3$, iron (III) oxide; FeOOH (or $Fe_2O_3.H_2O$), mono hydrated iron oxide (also known as yellow iron oxide); and combinations thereof. Preferably, the iron oxide is in the form of $Fe_2O_3$, iron (III) oxide. Chromium oxide is generally in the form of $Cr_2O_3$. chromium (III) oxide. However, other oxides of chromium are contemplated such as chromium (II) oxide (CrO), chromium dioxide (chromium (IV) oxide) ($CrO_2$), and chromium trioxide (chromium (VI) oxide) ($CrO_3$). For certain applications, particular grades of chromium oxide designated herein as "Chrome-A" and "Chrome-B" can be used. Chrome-A is a small crystal grade of $Cr_2O_3$ and Chrome-B is a larger crystal grade of $Cr_2O_3$.

The preferred embodiment pigments are derived from $Fe_2O_3$ and $Cr_2O_3$ in particular molar ratios. Typically, the preferred embodiment pigments comprise $Fe_2O_3$ and $Cr_2O_3$ in a range of Fe:Cr molar ratios, such as from about 10:1 to about 1:10, respectively, more preferably from about 9:1 to about 1:9, with a range of molar ratios of from 5:1 to 1:5 being most preferred for many applications. Depending upon the particular application, it may be desirable to utilize $Fe_2O_3$ and $Cr_2O_3$ in amounts corresponding to molar ratios of Fe:Cr of about 1:1, 2:1, 3:1, 4:1, 5:1, 1:2, 1:3, 1:4 and 1:5. All molar ratios expressed herein are with regard to molar amounts of iron (Fe) to chromium (Cr), unless otherwise indicated.

The preferred pigments are in the form of fine particles with a typical particle size most preferably from about 0.5 to about 2 µm, but can be from about 0.2 to about 10 µm.

Preferably, the material constituting the pigment is in the form of a solid solution having a formula $(Cr_xFe_yMe_z)_2O_n$ where $x+y+z=1$ and n is the number of oxygens required for electroneutrality, Me is at least one metal, x is greater than or equal to zero and less than or equal to one, y is greater than or equal to zero and less than or equal to one, and z is greater than or equal to zero and less than 0.3. Restated, this can be expressed as $0 \le x \le 1$, $0 \le y \le 1$, and $0 \le z < 0.3$. Preferably z is less than 0.2, and most preferably z is less than 0.1. These pigments may be designated as DCMA 3-05-3 or 3-06-7 by the Colored Pigment Manufacturers Association. The pigment may also include small amounts of free $Cr_2O_3$. As described in greater detail herein, the preferred pigment compositions are formed from iron oxide and chromium oxide and one or more optional components and are in the form of a solid solution, as opposed to a mixture of $Fe_2O_3$ and $Cr_2O_3$.

In another aspect, the present invention provides pigments comprising a solid solution having a formula $(Zn_aNi_bMn_cMe_d)(Cr_xFe_yMe_z)_2O_n$ where $a+b+c+d=1$, $x+y+z=1$, n is the number of oxygens required for electroneutrality, and Me is additional metal or metals with a combined d of less than 0.3 and a combined z of less than 0.3. Preferably, Me has a combined d of less than 0.1 and a combined z of less than 0.1. In certain applications, it may be preferred that Me has a combined d of less than 0.03 and a combined z of less than 0.03. These pigments may be designated as DCMA 13-33-7, 13-36-7, 13-37-7, 13-41-9, 13-48-7, 13-50-9 or 13-51-7 by the Colored Pigment Manufacturers Association.

Although it is generally preferred that the present invention pigments include solid solutions formed from a combination of iron oxide and chromium oxide with the phosphate additive as described herein, the invention also includes pigments consisting of either chromium oxide or iron oxide, with the phosphate additive. That is, the present invention includes pigments primarily including chromium oxide, formed with the phosphate additive as described herein. And, the present invention includes pigments primarily including iron oxide, formed with the phosphate additive as described herein. For certain applications, it may be desirable to provide pigments that consist essentially of either chromium oxide or iron oxide, with one or more optional components. The incorporation of such optional components may be undertaken so long as the basic and material properties of the preferred embodiment pigments are not affected, i.e. the color properties and increased solar reflectance characteristics described herein.

In accordance with the present invention, it has been discovered that the addition of one or more phosphate compounds and preferably iron phosphate, to pigments made from raw materials of iron oxide and chromium oxide and particularly during or prior to the formation of such pigments, provides significant improvements in the properties of the resulting pigment particles, and specifically in the total solar reflectance of the pigment. The iron phosphate may be in several forms such as $FePO_4$; iron (III) phosphate; $Fe_3(PO_4)_2$, iron (II) phosphate; or combinations thereof. Preferably, the iron phosphate is $FePO_4$. The typical particle size, and surface area of commercial grade $FePO_4$ are 3.2 µm (median), 4.0 µm (mean), and 10.5 m$^2$/g. It will be understood that these are merely representative values for particle size and surface area. Other grades of $FePO_4$ are known exhibiting different values. The present invention pigments can be made using a wide array of phosphate sources.

The amount of phosphate added to the pigment or more specifically to precursor compositions used to form the pigments in accordance with the present invention, may vary depending upon the desired characteristics of the resulting pigment and/or product utilizing such pigment. Preferably, the amount of the phosphate additive that is combined with the pigment precursor materials, is referred to herein as "an effective amount." That amount refers to an amount of the phosphate that when combined with the pigment precursor materials, mixed, and then heated as described herein; results in an increase in the reflectance of the resulting pigment as compared to those pigments without the added phosphate. Specifically, the reflectance is expressed in terms of total solar reflectance, as understood by those skilled in the art. Generally, the term "an effective amount" of the phosphate refers to from about 0.05% to about 5.0% of $PO_4$ by weight of the pigment precursor or precursor composition. However, it will be appreciated that the present invention includes the use of greater or lesser amounts of phosphate in the pigment precursor composition. For example, it is contemplated that an amount of phosphate as low as 0.01% $PO_4$ of the pigment precursor composition could be utilized. And, it is contemplated that amounts significantly greater than 5.0% $PO_4$ could be used, such as for example up to 20% $PO_4$ by weight of the pigment precursor composition.

The iron phosphate (which may be commercially available as ferric orthophosphate powder, $FePO_4$) can be used in an as-received form. It will be understood that such material is available from a wide array of different suppliers and various sources and can be used in the present invention. The iron phosphate powder is preferably blended with $Fe_2O_3$ and $Cr_2O_3$ as starting materials (not the finished pigments), with a typical particle size of 0.50 µm (median), 0.57 µm (mean), and surface area of 12.8 m$^2$/g for red iron oxide; typical particle size of 0.54 µm (median), 0.57 µm (mean), and surface area of 16.9 m$^2$/g for yellow iron oxide; typical particle size of 1.27 µm (median), 1.40 µm (mean), and surface area of 5.05 m$^2$/g for Chrome-A; and typical particle size of 1.96 µm (median), 2.16 µm (mean), and surface area of 2.34 m$^2$/g for Chrome-B in a blender. Physical mixing is performed. It will be appreciated that these values of particle size and surface area are merely representative. The present invention includes the use of other grades of $Fe_2O_3$ and $Cr_2O_3$ as starting materials in this regard. The physical mixing process provides appropriate mixing and shear such that at least a portion of the phosphate bearing material is present in the region of the iron oxide and chrome oxide particles, and preferably intimately mixed therewith. After blending, the iron oxide and chromium oxide raw materials and the iron phosphate additive, are heated so as to undergo a solid-state reaction at high temperatures. Details as to the preferred embodiment methods are described in greater detail herein.

It is contemplated that the phosphate allows this solid-state reaction to produce pigments with greater infrared (IR) reflection or solar reflection as described herein. It is not known whether the phosphate is on the surface of the resulting pigment particles, or if it is in the form of separated particles of $FePO_4$, or some other phosphate-containing crystalline or non crystalline composition. It is contemplated that the phosphate additive may also exist as an amorphous phase which does not react with the pigments or pigment precursors. X-ray diffraction (XRD) analysis on the resulting pigments suggests that 1) phosphates are in amorphous form;

and 2) they are not incorporated with the pigment crystal structures. Scanning electron microscope (SEM) also supported the XRD results.

Instead of, or in combination with, the noted iron phosphate, one or more other phosphate compounds can be added to the noted pigment particles or precursor materials used to form such particles. Preferred examples of such other phosphate compounds include, but are not limited to, phosphates of aluminum such as aluminum phosphate and alumina metaphosphate, and phosphates of ammonium such as ammonium phosphate, and combinations thereof. Aluminum phosphate is $AlPO_4$, and is widely available from an array of commercial sources. Chromium phosphate is $CrPO_4$. Alumina metaphosphate is $Al(PO_3)_3$. Ammonium phosphate is $(NH_4)_3PO_4$. It is also contemplated that other ammonium-based phosphate salts could be used such as diammonium hydrogen phosphate (or diammonium phosphate) which is $(NH_4)_2HPO_4$, and ammonium dihydrogen phosphate (or monoammonium phosphate) which is $NH_4.H_2PO_4$.

The present invention also includes several additional preferred aspects relating to particular pigments as designated under the Color Pigments Manufacturers Association (CPMA). These pigments include Green 17 which depending upon its formula, can include $Cr_2O_3$ and $Fe_2O_3$, Red 101/102, Brown 33, and Black 30.

Specifically, the present invention provides various preferred embodiment pigment compositions that correspond to each of these classes of pigments and which can receive the phosphate additives described herein. The pigment class designated as "Green 17" is also known as Chromium Green-Black Hematite, an inorganic pigment, and is a reaction product of high temperature calcination consisting principally of chromium (III) oxide as crystalline hematite. This pigment has a general chemical formula of $Cr_2O_3$. Its composition may include any one or a combination of the modifiers such as $Al_2O_3$, $Fe_2O_3$, or $Mn_2O_3$. Pigments in this class may be formed using the phosphate additives to impart improved solar reflectance properties to the resulting pigment.

The pigment class designated as "Red 101" is also known as Iron Brown Hematite, an inorganic pigment, and is a reaction product of high temperature calcination consisting principally of iron (III) oxide as crystalline hematite. This pigment has a general chemical formula of $Fe_2O_3$. Its composition may include any one or a combination of the modifiers such as $Cr_2O_3$, FeO, $Mn_2O_3$, or NiO. Pigments in this class may be formed using the phosphate additives to impart improved solar reflectance properties to the resulting pigment.

The pigment class designated as "Brown 33" is also known as Zinc Iron Chromite Brown Spinel, an inorganic pigment, and is a reaction product of high temperature calcination in which zinc (II) oxide, iron (II) oxide, iron (III) oxide, and chromium (III) oxide in varying amounts are homogeneously and ionically interdiffused to form a crystalline matrix of spinel. This pigment has a general chemical formula of $(Zn,Fe)(Fe,Cr)_2O_4$. Its composition may include any one or a combination of the modifiers such as $Al_2O_3$, NiO, $Sb_2O_5$, $SiO_2$, $SnO_2$, or $TiO_2$. Pigments in this class may be formed using the phosphate additives to impart improved solar reflectance properties to the resulting pigment.

The pigment class designated as "Black 30" is also known as Chrome Iron Nickel Black Spinel, an inorganic pigment, and is a reaction product of high temperature calcination in which chromium (II) oxide, iron (II) oxide, iron (III) oxide, and nickel (II) oxide in varying amounts are homogeneously and ionically interdiffused to form a crystalline matrix of spinel. The pigment has a general chemical formula of (Ni,Fe)(Cr,Fe)$_2$O$_4$. Its composition may include any one or a combination of the modifiers CuO, MnO, or $Mn_2O_3$. Pigments in this class may be formed using the phosphate additives to impart improved solar reflectance properties to the resulting pigment.

As noted, the various preferred embodiment pigments may also include one or more modifiers in their resulting crystal structure. For example, the pigments exhibiting a hematite structure may include one or more of the modifiers as set forth below in Table 1:

TABLE 1

Modifiers for Use in Preferred Embodiment Pigments Having Hematite Crystal Structure

| Modifier | Chemical Formula |
| --- | --- |
| Aluminum oxide | $Al_2O_3$ |
| Iron (III) oxide | $Fe_2O_3$ |
| Manganese (III) oxide | $Mn_2O_3$ |
| Chromium (III) oxide | $Cr_2O_3$ |
| Iron (II) oxide | FeO |
| Nickel (II) oxide | NiO |
| Titanium dioxide | $TiO_2$ |

And, the pigments exhibiting a spinel structure may include one or more of the modifiers as set forth below in Table 2:

TABLE 2

Modifiers for Use in Preferred Embodiment Pigments Having Spinel Crystal Structure

| Modifier | Chemical Formula |
| --- | --- |
| Aluminum oxide | $Al_2O_3$ |
| Nickel (II) oxide | NiO |
| Antimony oxide | $Sb_2O_5$ |
| Silicon dioxide | $SiO_2$ |
| Tin dioxide | $SnO_2$ |
| Titanium dioxide | $TiO_2$ |
| Copper (II) oxide | CuO |
| Manganese (II) oxide | MnO |
| Manganese (III) oxide | $Mn_2O_3$ |

Reference is made herein to pigments exhibiting a particular crystalline structure. For example, certain pigments are described herein as exhibiting a hematite crystal structure. And, other pigments are described herein as exhibiting a spinel crystal structure. As will be appreciated, the term "hematite crystal structure" is the crystal structure typically exhibited by the mineral hematite, which is one of several iron oxides. Hematite crystallizes in the rhombohedral (hexagonal) system and has the same crystal structure as corundum. The term "spinel crystal structure" refers to the crystal structure of a class of minerals which crystallize in the cubic (isometric) crystal system, in which the oxide anions are arranged in a cubic closely packed lattice and the cations occupy some or all of the octahedral and tetrahedral sites in the lattice.

Methods

The present invention also provides various methods for producing the pigments described herein. In a preferred aspect, the method comprises providing a pigment precursor composition that includes at least one of iron oxide and chromium oxide, and preferably both. The iron oxide and/or the chromium oxide can be in any of the forms described herein. An amount of a phosphate compound is added to the precursor composition to form a second composition. The preferred amount of the phosphate compound is such that an effective amount of phosphate is added. As previously noted, the effective amount of the phosphate is typically from about 0.05% to about 5.0%. The preferred phosphate compound is selected from phosphates of iron, phosphates of aluminum, phosphates of ammonium, and combinations thereof. Each of these compounds can be in the forms described herein. Thus, for example, if iron phosphate $FePO_4$ is used as the phosphate compound, in order to provide an effective amount of phosphate to the precursor composition, from about 0.1% to 8% of iron phosphate (based upon the weight of the precursor composition), is added to provide an effective amount of phosphate, i.e. from about 0.05% to about 5.0% $PO_4$.

The components are optionally milled to a fine powder and then preferably mixed in the appropriate proportions. Milling fineness is not critical, but average particle size diameters from approximately 0.2 µm to about 5 µm are preferred. Standard pigment grade metal oxide powders and precursors commercially available can generally be used without additional milling prior to mixing. Mixing can occur in a dry state, or the powders can be mixed in solution, dried, and then milled again if necessary to break up any particle agglomerations.

The second composition is then heated to a temperature of at least about 1500° F. to thereby form an improved pigment. Typically, heating is performed at a temperature of from about 1750° F. to about 2400° F. for about 0.5 to about 48 hours. However, it will be understood to those practicing the invention that a wide range of temperatures and times can be used, and that so long as the temperature and length of time used is sufficient to form the solid solutions according to the present invention, the temperature and length of time are not critical.

In many instances, it is unnecessary to mill or grind solid solutions formed according to the present invention after heating. However, when a smaller average particle size is desired or when a particular application requires strict avoidance of minor particle agglomerations, additional milling or grinding of the solid solutions can be performed. Heating can be achieved by placing the reactants in a crucible located inside a kiln, or other suitable device to heat the reactants. Heating can also be achieved through the use of a rotary calciner or other continuous calcining methods.

Although not wishing to be bound to any particular theory, it is believed that the presence of the one or more phosphate compounds particularly during formation of the crystalline structure of the pigment materials, reduces the amount or extent of IR absorbing components or characteristics, and thus increases solar reflectance. For example, it is believed that IR radiation can be absorbed by the existence of certain components in the pigment material. Alternatively or in addition, IR radiation can be absorbed by certain structural characteristics, i.e. defects, in the resulting crystal structure of the pigment material. The presence of the phosphate additives during formation of the pigment material, as demonstrated herein, surprisingly leads to the significant improvements in IR reflectance from the pigment material. Moreover, although the presence of the phosphate agents in the final pigment material may result in improvements in IR reflectance, it is also believed that such pigment materials, if formed or crystallized in the presence of the phosphate agents and then sufficiently treated and/or washed so as to remove all phosphates from the pigment material, would also exhibit improved IR reflectance characteristics. Generally, these improvements in IR reflectance are expressed in terms of improved total solar reflectance.

Reflectance

The present invention pigments exhibit improved reflectance or reflection properties (the terms "reflectance" and "reflection" are used interchangeably herein). Such improvements can for example be observed by improvements in infrared (IR) reflectance or improvements in solar reflectance (or more specifically, total solar reflectance (TSR)). As will be appreciated by those skilled in the art, total solar reflectance is the amount of reflected energy in the ultraviolet, visible and near infrared region of the solar spectrum divided by the total amount of incident solar energy. Generally, the preferred embodiment pigments exhibit improved total solar reflectance properties of at least 1%, more preferably at least 2%, more preferably at least 3%, more preferably at least 4%, and most preferably at least 5%. These various percentage improvements are all with regard to a corresponding pigment formed without the presence of the phosphate additive as described herein.

As noted, the preferred embodiment pigments exhibit improved solar reflectance properties such that the pigments reflect a relatively high proportion of light having a wavelength between 700 and 2500 nm, and preferably between 1300 and 1600 nm; while reflecting a relatively low proportion of light having a wavelength between 250 and 700 nm, and preferably between 400 and 600 nm.

The pigment having a formula $(Cr_xFe_yMe_z)_2O_n$ exhibits particular reflectance characteristics. Concerning light in the IR spectrum, preferably, the pigment exhibits an average reflection of greater than 45% for light having a wavelength between 700 and 2500 nm. And most preferably, the pigment exhibits an average reflection of greater than 50% for light having a wavelength between 700 and 2500 nm. More preferably, the pigment exhibits an average reflection of greater than 45% for light having a wavelength between 1300 and 1600 nm. And, most preferably, the pigment exhibits an average reflection of greater than 50% for light having a wavelength between 1300 and 1600 nm.

Regarding light in the visible spectrum, preferably the pigment having a formula $(Cr_xFe_yMe_z)_2O_n$ exhibits an average reflection of less than 40% for light having a wavelength between 250 and 700 nm. More preferably, the pigment exhibits an average reflection of less than 30% for light having a wavelength between 250 and 700 nm. And most preferably, the pigment exhibits an average reflection of less than 20% for light having a wavelength between 250 and 700 nm. For certain applications, it is preferred that for redirection, i.e. reflection, of light having a wavelength between 400 and 600 nm, the pigment exhibits an average reflection of less than 20%, more preferably less than 15%, and most preferably less than 10%.

As explained in detail in the results of various testing that was performed, these various reflection measurements were taken when the pigment material is in a pressed cup form. This testing method is also referred to herein as "Dry Pressed Powder" (DPP) testing method which is described in detail in U.S. Pat. No. 6,174,360 to Sliwinski et al. Another testing technique, described in detail in the results of testing herein, involved incorporating the pigments in an alkyd melamine (AM) paint system.

Significant energy cost savings can be achieved by use of the present invention pigments which exhibit the noted solar reflectance properties. Specifically, although the extent of solar reflectance of paints and coatings depends upon numerous factors; generally for many building applications, increasing total solar reflectance by only 1% can result in significant annual savings. A case study describing metal roofing containing infrared reflective pigments is provided in "Cool Metal Roofing Case Study" available from the Cool Metal Roofing Coalition of Pittsburgh, Pa.

Testing

In order to further assess the various aspects and benefits of the present invention, a series of investigations were undertaken to evaluate the reflectance properties of pigment derived from iron oxide in the form of $Fe_2O_3$ or FeOOH, chromium oxide in the form of $Cr_2O_3$, in varying molar ratios, and varying amounts of iron phosphate in the form of $FePO_4$. In another series of investigations, evaluations were conducted of pigments derived from iron oxide, chromium oxide, and varying amounts of alumina metaphosphate, $Al(PO_3)_3$. And in still another series of investigations, evaluations were made of pigments formed from iron oxide, chromium oxide, and varying amounts of ammonium phosphate, in the form of $NH_4H_2PO_4$. The results of these investigations are shown in FIGS. 1-5. Additional evaluations were undertaken to assess the specific effects upon reflectance of pigments formed using the phosphate additives as described herein. The reflectance of the pigments was measured over a range of light wavelengths that included both the visible spectrum and the infrared (IR) spectrum. The results of these investigations are shown in FIGS. 6-9.

The raw materials used were red iron oxide ($Fe_2O_3$), yellow iron oxide (FeOOH) and chrome oxide ($Cr_2O_3$). For the combination of $Fe_2O_3$ and $Cr_2O_3$, the powders of each were weighed at (Fe:Cr) molar ratios of (1:1 though 5:1) and (1:1 through 1:5) separately. For each molar ratio of Fe-Cr, additions of iron phosphate (iron orthophosphate, $FePO_4$) and other metal or non-metal phosphates in a range of 0% to 8.0 wt. % were added to the specific raw batch. After weighing the various raw batches, they were lab blended for 2 minutes using an Osterizer blender. Once homogenized after blending, the individual raw batches were placed into cordierite crucibles and fired in air at a temperature in the range from 1500° F. to 2000° F. Fifty grams of the calcined pigment was placed into a specimen mill with water and allowed to mill on a mechanical roll rack for 30 minutes. After milling, the pigment was separated from water by filtration. After separating the water from the pigment, the pigment was placed on a drying dish and allowed to dry in a drying oven at about 300° F. for approximately 2 hours. After drying, the pigment was evaluated in rigid polyvinyl chloride (RPVC) resin at a loading of test pigment to titania of 1:4 for color purposes. The resin was dispersed using a Two-Roll mill as known in the art.

For testing tint color, the pigment was evaluated in rigid polyvinyl chloride (RPVC) resin at a loading of test pigment to titania of 1:4 for color purposes. The resin was dispersed using a Two-Roll mill as known in the art.

For evaluating masstone color, the pigment was tested in an alkyd melamine paint. To aid in the dispersion of the pigment in the paint solvent, glass beads were used and mixing was performed on a mechanical shaker for 30 minutes. After 30 minutes of shaking, the dispersion was separated from the glass media by gravity filtration through a paint strainer. Then the paint was drawn down onto a Leneta card and allowed to cure in a drying oven at 200° F. for 45 minutes. After curing, color and total solar reflectance were measured. Solar reflectance was measured and is indicated according to ASTM test number E903.

For total solar reflectance, the pigment was tested and evaluated in one of two ways. The first method is a masstone color, i.e. the undiluted color, in an alkyd melamine (AM) paint system. Test results using this testing strategy are illustrated in FIGS. 1-5. The second method is a media-free (or, media-independent) "Dry Pressed Powder" (DPP) testing method for total solar reflectance as described in U.S. Pat. No. 6,174,360 to Sliwinski et al. As described in that patent, dry pigment samples were measured on a neat pressed cup powder sample using a Perkin Lambda 19 Spectrophotometer equipped with a Labsphere RSA-PE-19 reflectance spectroscopy accessory at a wavelength of 2.5 µm. Test results are illustrated in FIGS. 6-9.

In each of Examples 1-7 set forth below, a particular pigment composition was incorporated in the alkyd melamine paint system.

EXAMPLE 1

In this trial, pigment including $Fe_2O_3$ and $Cr_2O_3$ in a Fe:Cr molar ratio of 1:1 respectively, was used. Varying amounts of $FePO_4$ were added to produce treated pigment particles, which were incorporated into the noted paint, from which total solar reflectance was then measured. In these trials, the pigments were derived from $Fe_2O_3$ and $Cr_2O_3$ precursors at a Fe:Cr molar ratio of 1:1. The precursors were doped with varying amounts of $FePO_4$ in the raw batch and were processed as described herein. Specifically, iron phosphate was used in a weight range of from 0.1 to 8.0% by weight of the pigment precursor composition. This amount provided phosphate in an effective amount as described herein. The pigments were incorporated into an alkyd melamine paint system. Table 3 shows measured mass-tone color and total solar reflectance values for the paint trials. The results of Example 1 are illustrated graphically in FIG. 1 by the plot for 1:1. A control pigment free from any phosphate-containing compound exhibited a total solar reflectance of 21.8%. This is noted in FIG. 1. The tables below show that higher % TSR is achieved by addition while generally maintaining the same color characteristics as the control that is formulated without the use of addition (denoted as 0.00 $FePO_4$).

TABLE 3

Color and reflectance as tested in AM method for 1:1 metal molar ratio of $Fe_2O_3$ and $Cr_2O_3$ with the weight % additions of Iron Phosphate from 0.0-8.0%

| (1:1) FeCr | % TSR | L* | a* | b* |
|---|---|---|---|---|
| 0.00 $FePO_4$[†] | 21.8 | 27.53 | 2.22 | 0.59 |
| 0.10 $FePO_4$ | 22.4 | 27.78 | 2.72 | 0.96 |
| 0.25 $FePO_4$ | 23.4 | 28.19 | 3.31 | 1.43 |
| 0.50 $FePO_4$ | 24.7 | 28.49 | 3.65 | 1.77 |
| 1.00 $FePO_4$ | 25.2 | 28.13 | 2.89 | 1.18 |
| 2.00 $FePO_4$ | 24.1 | 27.32 | 1.89 | 0.42 |
| 4.00 $FePO_4$ | 23.9 | 27.27 | 1.8 | 0.34 |
| 8.00 $FePO_4$ | 23.9 | 27.18 | 1.68 | 0.18 |

EXAMPLE 2

In this trial, a pigment including $Fe_2O_3$ and $Cr_2O_3$ in a Fe:Cr molar ratio of 2:1, respectively was used. Varying amounts of $FePO_4$ were added. Table 4 sets forth the measured reflectance values for the paint trials using these treated pigments. The results of Example 2 are illustrated graphically in FIG. 1 by the plot designated as "1:2."

TABLE 4

Color and reflectance as tested in AM method for 2:1 metal molar ratio of $Fe_2O_3$ and $Cr_2O_3$ with the weight % addition of Iron Phosphate from 0.0-8.0%

| (2:1) FeCr | % TSR | L* | a* | b* |
|---|---|---|---|---|
| 0.00 $FePO_4$ | 21.9 | 26.96 | 1.67 | 0.06 |
| 0.10 $FePO_4$ | 22.5 | 27.1 | 2.08 | 0.32 |
| 0.25 $FePO_4$ | 23.4 | 27.42 | 2.69 | 0.74 |
| 0.50 $FePO_4$ | 24.7 | 27.7 | 3.16 | 1.08 |
| 1.00 $FePO_4$ | 24.8 | 27.28 | 2.29 | 0.42 |
| 2.00 $FePO_4$ | 23.7 | 26.92 | 1.4 | −0.09 |
| 4.00 $FePO_4$ | 23.6 | 27.05 | 1.38 | −0.09 |
| 8.00 $FePO_4$ | 23.5 | 26.92 | 1.32 | −0.16 |

EXAMPLE 3

In this trial, a pigment including $Fe_2O_3$ and $Cr_2O_3$ in a Fe:Cr molar ratio of 3:1, respectively, was used. Varying amounts of $FePO_4$ were added. Table 5 sets forth the measured reflectance values for the paint compositions using the treated pigments. The results of Example 3 are illustrated graphically in FIG. 1 by the plot designated as "1:3."

TABLE 5

Color and reflectance as tested in AM method for 3:1 metal molar ratio of $Fe_2O_3$ and $Cr_2O_3$ with the weight % addition of Iron Phosphate from 0.0-8.0%

| (3:1) FeCr | % TSR | L* | a* | b* |
|---|---|---|---|---|
| 0.00 $FePO_4$ | 23.0 | 27.29 | 1.75 | −0.18 |
| 0.10 $FePO_4$ | 23.6 | 27.37 | 2.13 | −0.04 |
| 0.25 $FePO_4$ | 24.3 | 27.49 | 2.62 | 0.38 |
| 0.50 $FePO_4$ | 25.1 | 27.7 | 2.97 | 0.51 |
| 1.00 $FePO_4$ | 23.1 | 27.18 | 1.83 | −0.06 |
| 2.00 $FePO_4$ | 21.0 | 27.3 | 1.4 | −0.34 |
| 4.00 $FePO_4$ | 19.9 | 27.19 | 1.44 | −0.21 |
| 8.00 $FePO_4$ | 20.5 | 27.25 | 1.51 | −0.25 |

EXAMPLE 4

In this trial, a pigment including $Fe_2O_3$ and $Cr_2O_3$ in a Fe:Cr molar ratio of 5:1, respectively, was used. Varying amounts of $FePO_4$ were added. Table 6 below, sets forth the measured reflectance values for the paint compositions using this pigment. The results of Example 4 are illustrated graphically in FIG. 1 by the plot designated as "1:5."

TABLE 6

Color and reflectance as tested in AM method for 5:1 metal molar ratio of $Fe_2O_3$ and $Cr_2O_3$ with the weight (%) addition of Iron Phosphate from 0.0-4.0%

| (5:1) FeCr | % TSR | L* | a* | b* |
|---|---|---|---|---|
| 0.00 $FePO_4$ | 21.2 | 27.52 | 2.55 | 0.08 |
| 0.50 $FePO_4$ | 23.3 | 27.81 | 3.15 | 0.55 |
| 1.00 $FePO_4$ | 21.0 | 27.6 | 2.1 | −0.09 |
| 2.00 $FePO_4$ | 19.2 | 27.52 | 1.67 | −0.2 |
| 4.00 $FePO_4$ | 18.8 | 27.64 | 1.75 | −0.11 |

EXAMPLE 5

Figure 1:
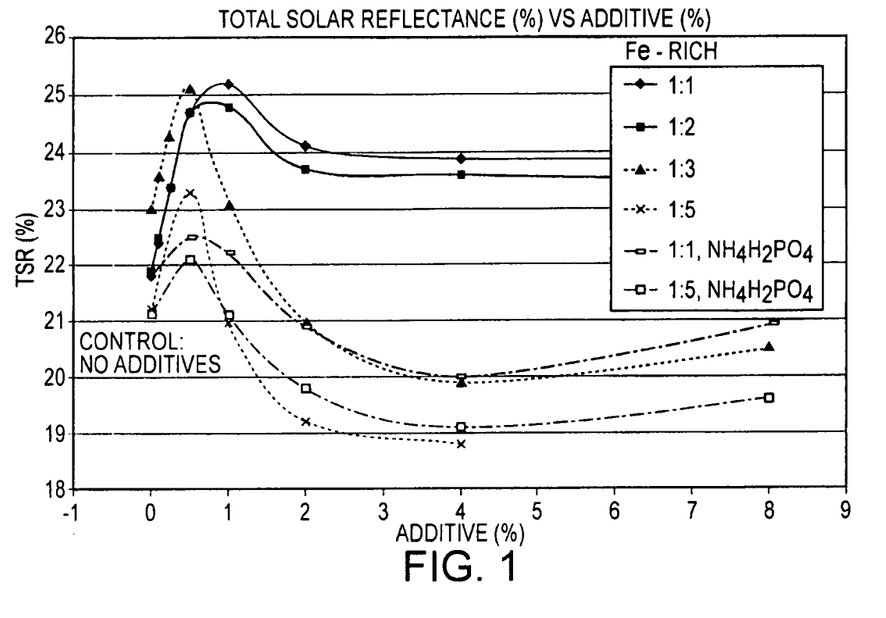
FIG. 1 is a graph of total solar reflectance percentage versus iron phosphate addition percentage in various iron-rich pigments.
Figure 2:
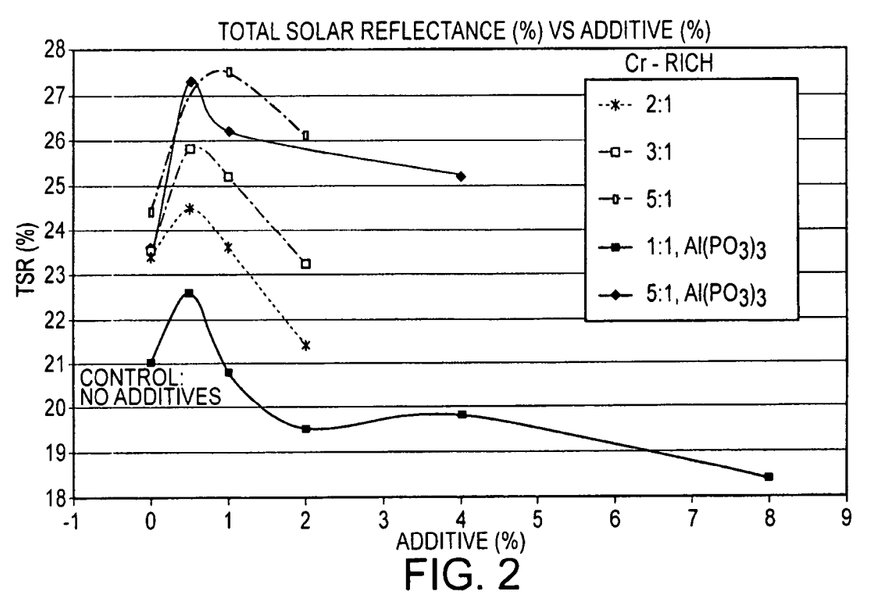
FIG. 2 is a graph of total solar reflectance percentage versus iron phosphate addition percentage in various chrome-rich pigments.

In this trial, a pigment including $Fe_2O_3$ and $Cr_2O_3$ in a Fe:Cr molar ratio of 1:2, respectively, was used. Varying amounts of $FePO_4$ were added. Table 7 sets forth the measured reflectance values for the paint compositions using the treated pigments. The results of Example 5 are illustrated graphically in FIG. 2 by the plot designated as "2:1" A control pigment free from any phosphate-containing compound exhibited a total solar reflectance of nearly 23.4%. This is shown in FIG. 2.

TABLE 7

Color and reflectance as tested in AM method for 1:2 metal molar ratio of $Fe_2O_3$ and $Cr_2O_3$ with the weight % addition of Iron Phosphate from 0.0-2.0%

| (1:2) FeCr | % TSR | L* | a* | b* |
|---|---|---|---|---|
| 0.00 $FePO_4$ | 23.4 | 27.92 | 2.67 | 1.42 |
| 0.50 $FePO_4$ | 24.5 | 28.69 | 3.08 | 2.01 |
| 1.00 $FePO_4$ | 23.6 | 28.67 | 3.04 | 1.74 |
| 2.00 $FePO_4$ | 21.4 | 27.37 | 2.22 | 0.95 |

EXAMPLE 6

In this trial, a pigment including $Fe_2O_3$ and $Cr_2O_3$ in a Fe:Cr molar ratio of 1:3, respectively, was used. Varying amounts of $FePO_4$ were added. Table 8 below, sets forth the measured reflectance values for the paint compositions using this pigment. The results of Example 6 are illustrated graphically in FIG. 2 by the plot designated as "3:1."

TABLE 8

Color and reflectance as tested in AM method for 1:3 metal molar ratio of $Fe_2O_3$ and $Cr_2O_3$ with the weight % addition of Iron Phosphate from 0.0-2.0%

| (1:3) FeCr | % TSR | L* | a* | b* |
|---|---|---|---|---|
| 0.00 $FePO_4$ | 23.5 | 28.7 | 2.88 | 1.91 |
| 0.50 $FePO_4$ | 25.8 | 29.87 | 3.21 | 2.74 |
| 1.00 $FePO_4$ | 25.2 | 29.5 | 3.13 | 2.29 |
| 2.00 $FePO_4$ | 23.2 | 28.36 | 2.69 | 1.61 |

EXAMPLE 7

In this trial, a pigment including $Fe_2O_3$ and $Cr_2O_3$ in a Fe:Cr molar ratio of 1:5, respectively; was used. Varying amounts of $FePO_4$ were added. Table 9 sets forth the measured reflectance values for the paint compositions using the treated pigments. The results of Example 7 are illustrated graphically in FIG. 2 by the plot designated as "5:1."

TABLE 9

Color and reflectance as tested in AM method for 1:5 metal molar ratio of $Fe_2O_3$ and $Cr_2O_3$ with the weight % addition of Iron Phosphate from 0.0-2.0%

| (1:5) FeCr | % TSR | L* | a* | b* |
|---|---|---|---|---|
| 0.00 $FePO_4$ | 24.4 | 30.64 | 3.1 | 3.34 |
| 0.50 $FePO_4$ | 27 | 31.7 | 2.71 | 3.97 |
| 1.00 $FePO_4$ | 27.5 | 31.15 | 2.81 | 3.49 |
| 2.00 $FePO_4$ | 26.1 | 30.16 | 3.07 | 2.97 |

In Examples 8-9, instead of using iron phosphate, alumina metaphosphate, $Al(PO_3)_3$ was utilized, in varying amounts. In Example 8, a pigment including $Fe_2O_3$ and $Cr_2O_3$ in a Fe:Cr molar ratio of 1:5, respectively was used. Varying amounts of $Al(PO_3)_3$ were used. The results of Example 8 are presented in Table 10 and graphically in FIG. 2 by the plot designated as "5:1, $Al(PO_3)_3$."

TABLE 10

Color and reflectance as tested in AM method for 1:5 metal molar ratio of $Fe_2O_3$ and $Cr_2O_3$ with the weight % addition of Alumina Metaphosphate $(Al(PO_3)_3)$ from 0.0-4.0%

| (1:5) FeCr | % TSR | L* | a* | b* |
|---|---|---|---|---|
| 0.00 $FePO_4$ | 24.4 | 30.64 | 3.1 | 3.34 |
| 0.50 $FePO_4$ | 27 | 31.7 | 2.71 | 3.97 |
| 1.00 $FePO_4$ | 27.5 | 31.15 | 2.81 | 3.49 |
| 2.00 $FePO_4$ | 26.1 | 30.16 | 3.07 | 2.97 |

EXAMPLE 9

In this trial, a pigment including $Fe_2O_3$ and $Cr_2O_3$ in a Fe:Cr molar ratio of 1:1, respectively was used. Varying amounts of $Al(PO_3)_3$ were added. The results of Example 9 are presented in Table 11 and illustrated in FIG. 2 by the plot designated as "1:1, $Al(PO_3)_3$."

TABLE 11

Color and reflectance as tested in AM method for 1:1 metal molar ratio of $Fe_2O_3$ and $Cr_2O_3$ with the weight % addition of Alumina Metaphosphate $(Al(PO_3)_3)$ from 0.0-8.0%

| (1:1) FeCr | % TSR | L* | a* | b* |
|---|---|---|---|---|
| 0.00 $Al(PO_3)_3$ | 21 | 27.21 | 2.08 | 0.55 |
| 0.50 $Al(PO_3)_3$ | 22.6 | 28.05 | 2.99 | 1.24 |
| 1.00 $Al(PO_3)_3$ | 20.8 | 27.28 | 2.12 | 0.63 |
| 2.00 $Al(PO_3)_3$ | 19.5 | 26.96 | 1.56 | 0.15 |
| 4.00 $Al(PO_3)_3$ | 19.8 | 27.03 | 1.54 | 0.16 |
| 8.00 $Al(PO_3)_3$ | 18.4 | 26.9 | 1.15 | −0.09 |

In Examples 10-11, instead of using iron phosphate or alumina metaphosphate, ammonium dihydrogen phosphate, $NH_4H_2PO_4$ was utilized. In Example 10, $Fe_2O_3$ and $Cr_2O_3$ were used in a Fe:Cr molar ratio of 1:1, respectively. Varying amounts of $NH_4H_2PO_4$ were used. The results of Example 10 are presented in Table 12 and are illustrated graphically in FIG. 1 by the plot designated as "1:1, $NH_4H_2PO_4$." It is significant that upon addition of the phosphates as described herein, the soluble $Cr^{6+}$ content in the resulting pigment has been significantly reduced. The testing results set forth herein suggest that addition of iron phosphate may also be used to reduce soluble chrome reduction. See Table 12 for example.

TABLE 12

1:1 metal molar ratio of $Fe_2O_3$ and $Cr_2O_3$ with the weight % addition of Ammonium Phosphate $(NH_4H_2PO_4)$ from 0.0-8.0%

| (1:1) FeCr | % TSR | L* | a* | b* | $Cr^{6+}$ |
|---|---|---|---|---|---|
| 0.00 $NH_4H_2PO_4$ | 21.8 | 27.61 | 2.58 | 1.07 | 696.3 ppm |
| 0.50 $NH_4H_2PO_4$ | 22.5 | 28.08 | 3.01 | 1.34 | |
| 1.00 $NH_4H_2PO_4$ | 22.2 | 27.9 | 2.73 | 1.12 | 45.6 ppm |
| 2.00 $NH_4H_2PO_4$ | 20.9 | 27.05 | 2.21 | 0.76 | |
| 4.00 $NH_4H_2PO_4$ | 20 | 26.87 | 1.89 | 0.58 | |
| 8.00 $NH_4H_2PO_4$ | 20.9 | 27.04 | 2.15 | 0.69 | |

EXAMPLE 11

In this trial, a pigment including $Fe_2O_3$ and $Cr_2O_3$ in a Fe:Cr molar ratio of 5:1, respectively, was used. Varying amounts of $NH_4H_2PO_4$ were used. The results of Example 11 are presented in Table 13 and shown graphically in FIG. 1 by the plot designated as "1:5, $NH_4H_2PO_4$."

TABLE 13

5:1 metal molar ratio of $Fe_2O_3$ and $Cr_2O_3$ with the weight % addition of Ammonium Phosphate $(NH_4H_2PO_4)$ from 0.0-8.0%

| (5:1) FeCr | % TSR | L* | a* | b* |
|---|---|---|---|---|
| 0.00 $NH_4H_2PO_4$ | 21 | 27.51 | 2.53 | 0.08 |
| 0.50 $NH_4H_2PO_4$ | 22.6 | 27.56 | 2.8 | 0.21 |
| 1.00 $NH_4H_2PO_4$ | 20.8 | 27.48 | 2.18 | −0.11 |
| 2.00 $NH_4H_2PO_4$ | 19.5 | 27.46 | 1.66 | −0.31 |
| 4.00 $NH_4H_2PO_4$ | 19.8 | 27.5 | 1.7 | −0.27 |
| 8.00 $NH_4H_2PO_4$ | 18.4 | 27.48 | 1.77 | −0.2 |

The results of Examples 1-11 demonstrate that significant improvements in total solar reflectance can be achieved for iron-chrome pigments by incorporation of certain phosphate-containing compounds in particular proportions. Generally, for iron-rich pigments, when using iron phosphate as an additive, improvements in total solar reflectance can range up to about 5% or more. That is, for a control pigment containing iron oxide and chromium oxide which exhibits a particular solar reflectance, by incorporating a phosphate compound as described herein, solar reflectance of the treated pigment can be increased by up to another 5 percentage units, and typically at least 1% and often in the range of 2% to 3%. These increases in solar reflectance can lead to significant energy cost savings if the various pigments are incorporated in coatings or other paint formulations for example.

For chromium-rich pigments, the improvements in solar reflectance upon addition of phosphate compounds can be even more dramatic. For instance, when using concentrations of iron phosphate in a range of up to about 2%, solar reflectance of the pigment can be increased by up to about 6.5 percentage units or more. This improvement is remarkable. Improvements for chromium-rich pigments are typically at least 1% and usually at least 2% to 3% as compared to corresponding pigment without the phosphate additive. Again, these increases in solar reflectance can lead to significant savings in energy costs.

In Examples 12-13, instead of using $Fe_2O_3$, FeOOH (yellow iron) was used in conjunction with $Cr_2O_3$. Varying amounts of iron phosphate $FePO_4$ were used. In Example 12, FeOOH and $Cr_2O_3$ were used in a Fe:Cr molar ratio of 5:1, respectively. The results of Example 12 are presented in Table 14 and shown graphically in FIG. 4 by the plot designated as "CrFe=1:5."

TABLE 14

5:1 metal molar ratio of FeOOH (yellow iron) and $Cr_2O_3$ with the weight % addition of Iron Phosphate from 0.0-2.0%

| (5:1) FeCr | % TSR | L* | a* | b* |
|---|---|---|---|---|
| 0.00 $FePO_4$ | 21.4 | 27.51 | 2.7 | 0.16 |
| 0.50 $FePO_4$ | 23.9 | 27.56 | 2.48 | 0.02 |
| 1.00 $FePO_4$ | 24.9 | 27.19 | 1.2 | −0.53 |
| 2.00 $FePO_4$ | 24.4 | 27.34 | 1.28 | −0.43 |

In Example 13, FeOOH and $Cr_2O_3$ were used in a Fe:Cr molar ratio of 1:5, respectively. The results of Example 13 are presented below in Table 15 and illustrated graphically in FIG. 4 by the plot designated as "CrFe=5:1."

TABLE 15

1:5 metal molar ratio of FeOOH (yellow iron) and Cr₂O₃ with
the weight % addition of Iron Phosphate from 0.0-2.0%

| (1:5) FeCr | % TSR | L* | a* | b* |
|---|---|---|---|---|
| 0.00 FePO₄ | 22.5 | 29.4 | 2.68 | 2.37 |
| 0.50 FePO₄ | 26.2 | 30.6 | 2.49 | 3.28 |
| 1.00 FePO₄ | 27.2 | 29.87 | 2.44 | 2.56 |
| 2.00 FePO₄ | 26.8 | 29.13 | 2.49 | 2.02 |

In Example 14, Fe₂O₃ and Cr₂O₃ were used in a Fe:Cr molar ratio of 1:1 respectively. Iron phosphate, FePO₄ was added in varying amounts. The data in Table 16 demonstrates that the additive improves the IR reflectance without deterioration of the color of the pigments. The RPVC tint color results in Table 16 demonstrate that the colors are constantly acceptable within industrial tolerances. This data is not illustrated in the accompanying figures.

TABLE 16

1:1 metal molar ratio of Fe₂O₃ and Cr₂O₃ with
the weight % additions of Iron Phosphate from 0.0-8.0%

| (1:1) FeCr | % TSR | L* | a* | b* |
|---|---|---|---|---|
| 0.00 FePO₄ | 21.8 | 51.53 | 1.91 | −3.27 |
| 0.10 FePO₄ | 22.4 | 51.45 | 2.39 | −2.88 |
| 0.25 FePO₄ | 23.4 | 49.92 | 3.24 | −2.05 |
| 0.50 FePO₄ | 24.7 | 49.83 | 3.61 | −1.53 |
| 1.00 FePO₄ | 25.2 | 51.64 | 2.2 | −2.87 |
| 2.00 FePO₄ | 24.1 | 53.09 | 1.28 | −3.8 |
| 4.00 FePO₄ | 23.9 | 53.82 | 1.11 | −3.95 |
| 8.00 FePO₄ | 23.9 | 54.06 | 0.97 | −4.13 |

In another example, different grades of chromium oxide (Chrome-B) were used. In Example 15, Fe₂O₃ and Cr₂O₃ (Chrome-B) were used in a Fe:Cr molar ratio of 1:1, respectively. FePO₄ was added in varying amounts. The results of Example 15 are presented in Table 17 and illustrated graphically in FIG. 5. Similar results were also observed in pigments formed having molar ratios of Fe:Cr of 1:2 and 1:5.

TABLE 17

1:1 metal molar ratio of Fe₂O₃ and Cr₂O₃ with
the weight % additions of Iron Phosphate from 0.0-8%.

| (1:1) FeCr | % TSR | L* | a* | b* |
|---|---|---|---|---|
| 0.00 FePO₄ | 19.9 | 27.45 | 1.67 | 0.41 |
| 0.50 FePO₄ | 21.3 | 27.42 | 1.96 | 0.58 |
| 1.00 FePO₄ | 19 | 27.02 | 1.29 | 0.08 |
| 2.00 FePO₄ | 18.9 | 26.99 | 1.25 | 0.1 |
| 8.00 FePO₄ | 19.4 | 26.99 | 1.41 | 0.14 |

EXAMPLE 16

Figure 3:
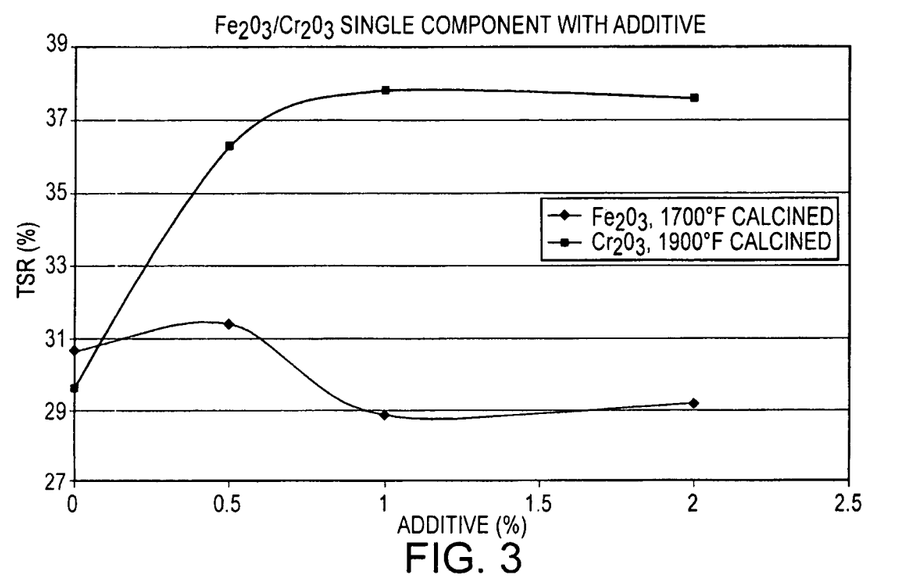
FIG. 3 is a graph of total solar reflectance percentage versus iron phosphate addition percentage in calcined individual iron oxide and chromium oxide pigment samples.
Figure 4:
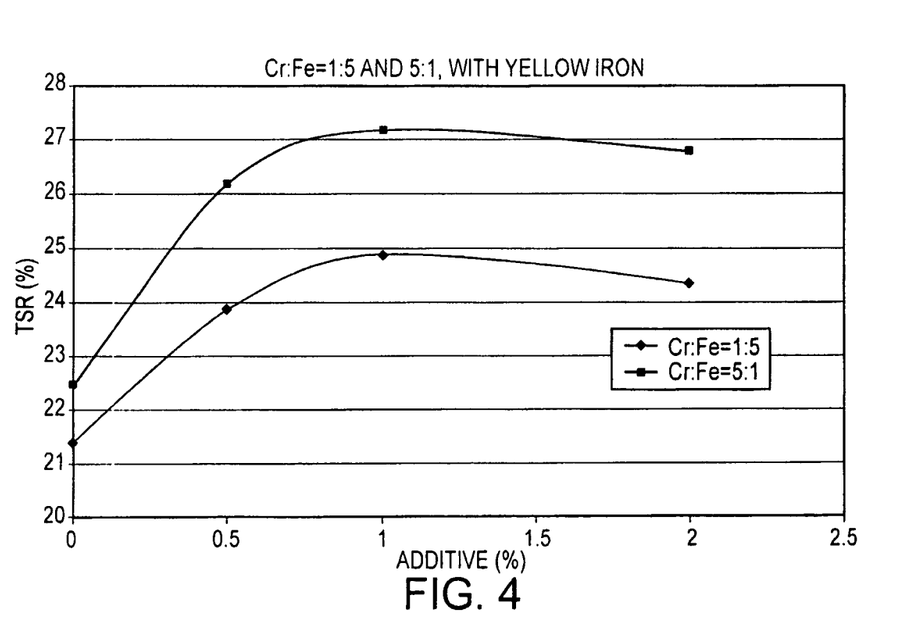
FIG. 4 is a graph of total solar reflectance percentage versus iron phosphate addition percentage in pigments including yellow iron and chromium oxide.
Figure 5:
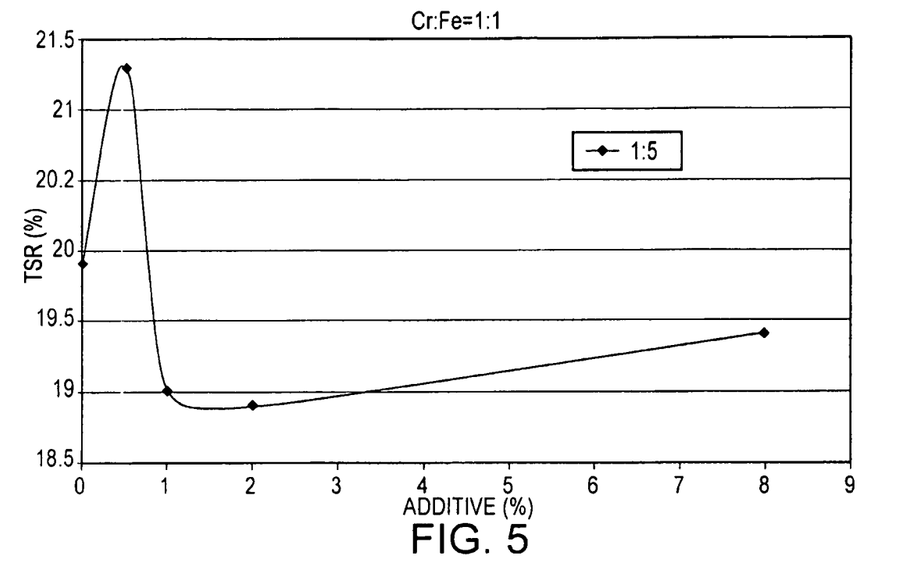
FIG. 5 is a graph of total solar reflectance percentage versus iron phosphate in pigments including iron oxide and a particular grade of chromium oxide referred to herein as Chrome-B.

In this example, single components, i.e. either iron (III) oxide, Fe₂O₃ or chromium (III) oxide, Cr₂O₃ were combined with varying amounts of iron (III) phosphate additive, FePO₄, and the material heated to either 1700° F. or 1900° F. The resulting total solar reflectance percentage of each sample is shown in FIG. 3. It can be seen that the chromium oxide receiving amounts of iron phosphate up to 2%, generally improves the solar reflectance of particles of chromium oxide. However, addition of iron phosphate to iron oxide, slightly increases the solar reflectance for concentrations of iron phosphate up to about 0.5%, and then detrimentally reduces the solar reflectance for greater concentrations. Thus, it is remarkable and surprising that the overall solar reflectance of pigment including both iron oxide and chromium oxide is increased, and increased to the extent as described herein, upon incorporation of the phosphate additives described herein.

EXAMPLE 17

Figure 9:
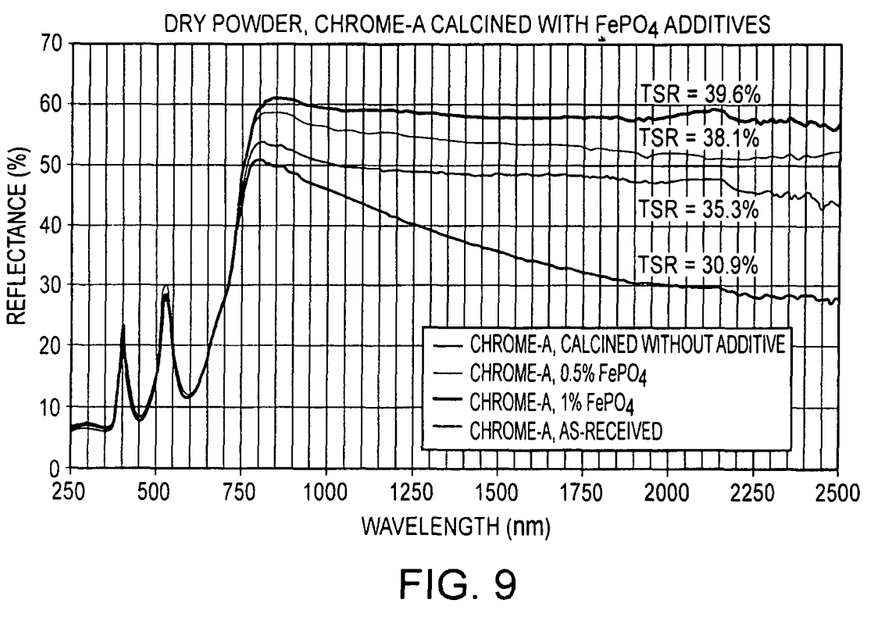
FIG. 9 is a graph of average reflectance values for pigments derived from a particular grade of chromium oxide designated as Chrome-A, and varying amounts of an iron phosphate additive.

One other pigment, such as Chrome-A green, was tested with adding FePO₄ additive. That pigment also exhibited significantly improved total solar reflectance. The improved IR performance is illustrated in FIG. 9. It can be noted from this curve that while minimal change in reflection occurs in the visible region where color is determined, significant increases in reflection occur in the IR region of the curve.

The foregoing data and testing results, indicate that relatively large changes in IR performance of a pigment can be accomplished with relatively minor changes in color of the pigment. This is particularly evident by comparing DE values which may be readily calculated from the values of L*, a*, and b*.

In another series of trials, various pigment compositions were prepared as described herein. Reflectance values were taken according to the DPP method. These investigations reveal specific regions of light, or ranges of light wavelength, that are preferably reflected and/or not reflected to varying extents, in accordance with the present invention.

EXAMPLE 18

In this investigation, three pigment compositions were prepared using 0%, 1%, or 2% of FePO₄ as the phosphate additive. The pigment compositions were formed from Chrome-A and red iron oxide in proportions to provide a molar ratio of Fe:Cr of 1:1. The reflectance testing results are presented in FIG. 6.

Figure 6:
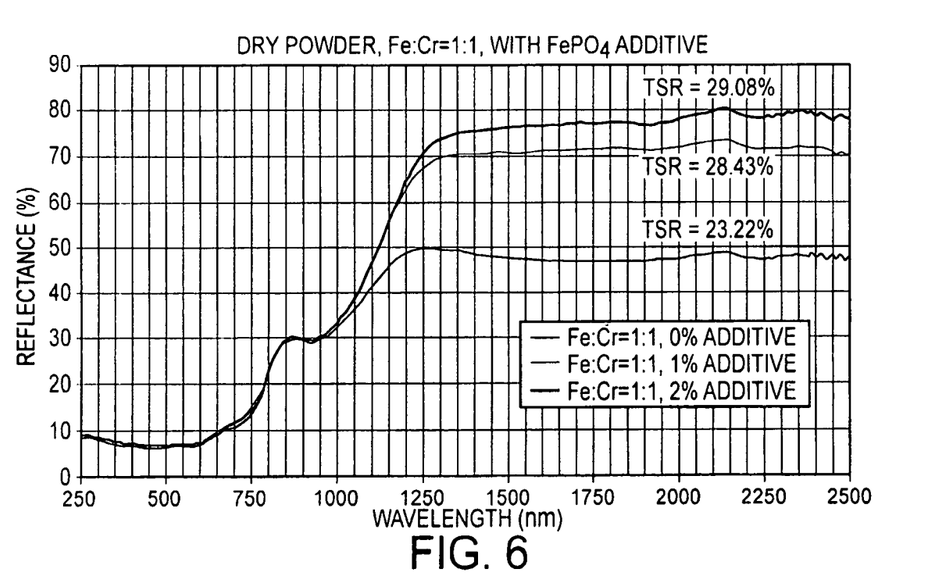
FIG. 6 is a graph of average reflectance values for pigments having a molar ratio of Fe to Cr of 1:1, derived using varying amounts of an iron phosphate additive.

Referring to FIG. 6, it can be seen that the compositions formed in the presence of iron phosphate exhibited nearly identical reflectance curves as the composition that was formed in the absence of the phosphate additive, within the visible spectrum, i.e. 250 to 700 nm, and particularly in the range of 400 to 600 nm. However, for light in the IR spectrum, i.e. between 700 and 2500 nm and preferably between 1300 and 1600 nm, the pigments formed using 1% or 2% iron phosphate exhibited significantly greater reflectance values than pigment formed in the absence of iron phosphate, i.e. the 0% pigment. Specifically, at a wavelength of 1500 nm, the pigment formed in the absence of iron phosphate exhibited a reflectance of about 48% (and a TSR of 23.22%), while pigments formed in the presence of iron phosphate exhibited reflectance values of about 72% for the 1% (and a TSR of 28.43%) additive, and about 76% for the 2% (and a TSR of 29.08%) additive. This data demonstrates the remarkable IR reflecting performance and consistent color qualities of the preferred embodiment pigment compositions according to the present invention.

EXAMPLE 19

In this example, pigment compositions were formed from Chrome-A and red iron' oxide in a Fe:Cr ratio of 1:5, using either 0%, 1%, or 2% of iron phosphate FePO₄. After formation of the pigments, reflectance measurements were taken according to the DPP method. The measured reflectance values are illustrated in FIG. 7.

Figure 7:
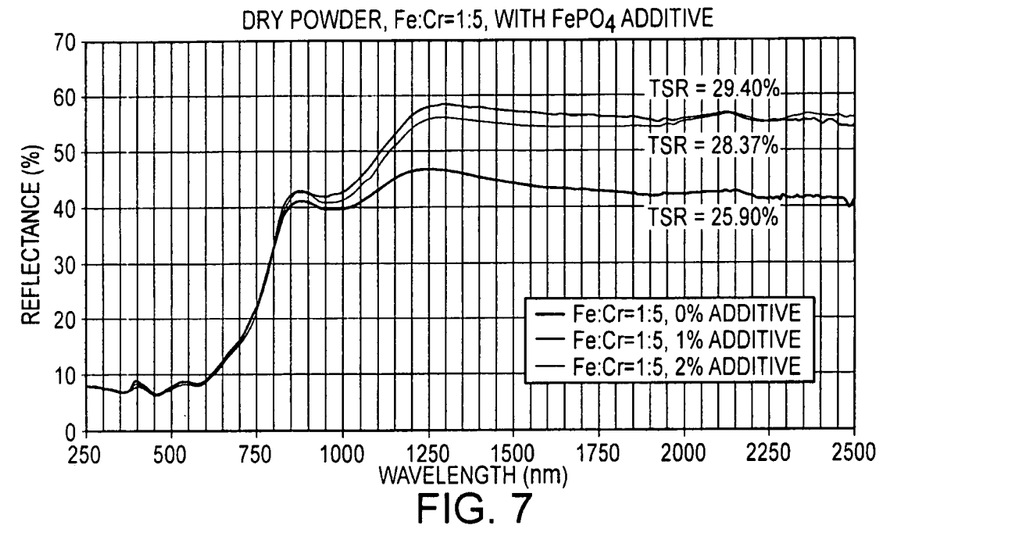
FIG. 7 is a graph of average reflectance values for pigments having a molar ratio of Fe to Cr of 1:5, derived using varying amounts of an iron phosphate additive.

Referring to FIG. 7, the significant improvement in reflection in the IR region are evident, while the color qualities of the pigments formed using phosphate can be seen to be nearly identical as the pigment free of phosphate, in the visible light region. Specifically, at a light wavelength of 1500 nm, pigment prepared in the absence of phosphate exhibited a reflectance of about 44%, while pigments prepared using 1% and 2% iron phosphate exhibited reflectance values of about 57% and about 55%, respectively. Again, these are remarkable improvements in IR reflectance.

EXAMPLE 20

In this investigation, two pigment compositions were prepared using Chrome-A and red iron oxide in a molar ratio of Fe:Cr of 5:1. One composition was prepared using 0.5% iron phosphate $FePO_4$, and the other composition was prepared in the absence of any phosphate additive. The results of the reflectance of these compositions measured by the DPP method are presented in FIG. 8.

Figure 8:
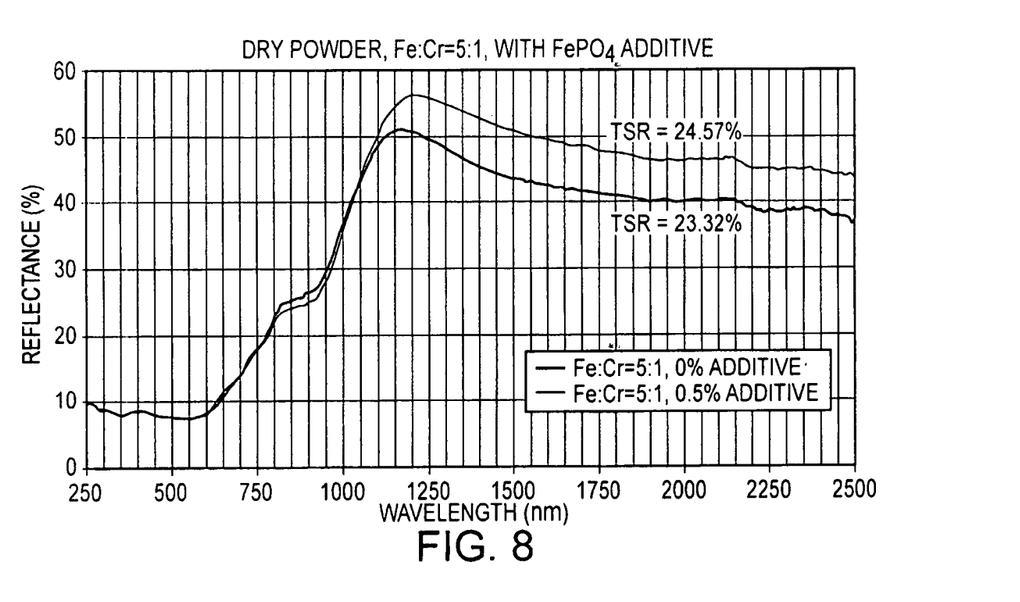
FIG. 8 is a graph of average reflectance values for pigments having a molar ratio of Fe to Cr of 5:1, derived using varying amounts of an iron phosphate additive.

FIG. 8 demonstrates that a pigment formed in the presence of only a small amount of the phosphate additive, i.e. 0.5% $FePO_4$, exhibits significant improvements in IR reflectance while maintaining nearly identical color characteristics in the visible spectrum, as a corresponding pigment formed without the phosphate additive.

EXAMPLE 21

In this investigation, a collection of pigments was prepared using chromium oxide of the type designated as Chrome-A. A first sample consisting of Chrome-A in its as-received form was tested in accordance with the DPP method. Another sample of Chrome-A in its as-received form was calcined in the absence of a phosphate additive and then tested. Two other samples were preparing by combining Chrome-A with 0.5% or 1% iron phosphate $FePO_4$, and then tested.

The results of this testing are illustrated in FIG. 9. All four samples exhibited remarkable color consistency and nearly identical color characteristics in the visible light spectrum, i.e. between 250 and 700 nm and preferably between 400 and 600 nm. Regarding the reflectance performance of the samples in the IR region, i.e. between 700 and 2500 nm and preferably between 1300 and 1600 nm, the sample that was heated in the absence of the phosphate additive actually exhibited a decrease in reflection as compared to the sample tested in its as-received form (and free of any phosphate additive). The two samples formed using 0.5% and 1% iron phosphate exhibited remarkable and significant improvements in IR reflection, as evident from FIG. 9.

Adding phosphates to pigments derived from at least one of iron oxide and chromium oxide, increases the total solar reflectance of the resulting pigment without the addition of other costly additives. The benefits are significant because the more solar energy that is reflected from a structure coated with the preferred embodiment pigments, the less energy costs required in cooling and related air conditioning. Furthermore, use of the pigments and compositions comprising such pigments will result in less product degradation in structural paint coatings, metal roofing, automotive interiors and exteriors, vinyl siding and other applications.

It is believed that improvements in solar reflectance could also be realized by incorporation of the phosphate additive in other pigments and pigment families. In addition, it is believed that the phosphate additive could be added and used in conjunction with a wide array of modifiers such as $Al_2O_3$ and $Mn_2O_3$, in many different pigments and pigment classes.

The range of the phosphate addition would be from about 0.05 to about 5.0 weight percent. However, it will be appreciated that the present invention includes the use of a lesser amount(s) and greater amount(s) of the phosphate additive so long as the unique reflectance properties described herein are exhibited by the resulting pigments or pigmented materials.

Additional background information pertaining to incorporation of additives in pigments are set forth in U.S. Pat. No. 6,174,360 to Sliwinski et al.

Many other benefits will no doubt become apparent from future application and development of this technology.

All patents, published applications, standards, and articles noted herein are hereby incorporated by reference in their entirety.

As described hereinabove, the present invention solves many problems associated with previous pigments and coatings. However, it will be appreciated that various changes in the details, materials and formulations, which have been herein described and illustrated in order to explain the nature of the invention, may be made by those skilled in the art without departing from the principle and scope of the invention, as expressed in the appended claims.

What is claimed is:

1. A black colored pigment exhibiting improved solar reflectance, the pigment comprising:
a material formed in the presence of an effective amount of a phosphate and in the form of a solid solution having a formula $(Cr_xFe_yMe_z)_2O_n$ wherein x+y+z=1, n is the number of oxygens required for electroneutrality, Me is at least one metal, and z is less than 0.3, wherein x and y cannot be zero;
wherein the material when in a pressed cup form, exhibits an average reflection of less than p20% for light having a wavelength between 400 and 600 nm;
wherein the material when in a pressed cup form, exhibits an average reflection of greater than 40% for light having a wavelength between 1300 and 1600 nm; and
wherein the material includes phosphate ions.

2. The pigment of claim 1 wherein z is less than 0.2.

3. The pigment of claim 1 wherein the material exhibits an average reflection of less than 15% for light having a wavelength between 400 and 600 nm.

4. The pigment of claim 1 wherein the material exhibits an average reflection of less than 10% for light having a wavelength between 400 and 600 nm.

5. The pigment of claim 4 wherein the material exhibits an average reflection of less than 5% for light having a wavelength between 400 nm and 600 nm.

6. The pigment of claim 1 wherein the material exhibits an average reflection of greater than 45% for light having a wavelength between 1300 and 1600 nm.

7. The pigment of claim 1 wherein the material exhibits an average reflection of greater than 50% for light having a wavelength between 1300 and 1600 nm.

8. A brown or green pigment exhibiting improved solar reflectance, the pigment comprising:
a material formed in the presence of an effective amount of a phosphate and in the form of a solid solution having a formula $(Cr_xFe_yMe_z)_2O_n$ wherein x +y+z=1, n is the number of oxygens required for electroneutrality, Me is at least one metal, and z is less than 0.3 wherein x and y cannot be zero;
wherein the material when in a pressed cup form, exhibits an average reflection of less than 25% for light having a wavelength between 400 and 600 nm;

wherein the material when in a pressed cup form, exhibits an average reflection of greater than 50% for light having a wavelength between 1300 and 1600 nm; and wherein the material includes phosphate ions.

9. The pigment of claim 8 wherein the material exhibits an average reflection of less than 20% for light having a wavelength between 400 and 600 nm.

10. The pigment of claim 8 wherein the material exhibits an average reflection of less than 15% for light having a wavelength between 400 and 600 nm.

11. The pigment of claim 8 wherein the material exhibits an average reflection of greater than 55% for light having a wavelength between 1300 and 1600 nm.

12. A method for forming a pigment exhibiting improved solar reflectance, the method comprising:

providing a pigment precursor composition including at least one of iron oxide and chromium oxide;

adding an effective amount of a phosphate compound to the precursor composition;

heating the precursor composition and phosphate compound to a temperature of at least 1500° F. to form a secondary composition;

cooling the secondary composition to thereby form a pigment, the pigment including a material in the form of a solid solution having either (i) a formula $(Cr_xFe_yMe_z)_2O_n$ wherein $x+y+z=1$, n is the number of oxygens required for electroneutrality, Me is at least one metal, and z is less than 0.3 wherein x and y cannot be zero; and wherein the material when in a pressed cup form, exhibits an average reflection of less than 20% for light having a wavelength between 400 and 600 nm; wherein the material when in a pressed cup form, exhibits an average reflection of greater than 40% for light having a wavelength between 1300 and 1600 nm; wherein the material includes phosphate ions.

13. The method of claim 12 wherein heating is performed at a temperature of from about 1750° F. to about 2250° F. for about 0.5 to about 48 hours.

* * * * *